United States Patent [19]

Gladrow

[11] 4,147,613

[45] Apr. 3, 1979

[54] HYDROCARBON CONVERSION PROCESS UTILIZING A CATALYST COMPRISING A ZEOLITE, A ZIRCONIA-CONTAINING MATRIX AND AN ADSORBENT

[75] Inventor: Elroy M. Gladrow, Baton Rouge, La.

[73] Assignee: Exxon Research & Engineering Co., Florham Park, N.J.

[21] Appl. No.: 862,175

[22] Filed: Dec. 19, 1977

Related U.S. Application Data

[60] Division of Ser. No. 836,221, Sep. 21, 1977, which is a continuation-in-part of Ser. No. 746,188, Nov. 30, 1976, which is a continuation-in-part of Ser. No. 626,225, Oct. 28, 1975, abandoned.

[51] Int. Cl.$^2$ .................. C10G 11/04; B01J 29/12
[52] U.S. Cl. .................. 208/120; 208/46; 208/251 R; 252/455 Z; 252/477 R
[58] Field of Search .................. 252/455 Z; 208/120

[56] References Cited

U.S. PATENT DOCUMENTS

| | | | |
|---|---|---|---|
| 3,312,615 | 4/1967 | Cramer et al. | 208/120 |
| 3,556,988 | 1/1971 | Stover et al. | 208/120 |
| 3,558,476 | 1/1971 | Robbins et al. | 208/120 |
| 3,804,747 | 4/1974 | Kimberlin et al. | 208/120 |
| 3,944,482 | 3/1976 | Mitchell et al. | 208/120 |

*Primary Examiner*—Delbert E. Gantz
*Assistant Examiner*—G. E. Schmitkons
*Attorney, Agent, or Firm*—Marthe L. Gibbons

[57] ABSTRACT

A hydrocarbon conversion process suitable for the conversion of heavy hydrocarbon oils containing large amounts of metallic contaminants, such as petroleum residua, utilizes a catalyst comprising an inroganic oxide gel matrix comprising a major amount of silica, and minor amounts of zirconia and alumina, from about 15 to about 40 weight percent of an adsorbent such as bulk alumina, and a crystalline aluminosilicate zeolite.

11 Claims, No Drawings

HYDROCARBON CONVERSION PROCESS UTILIZING A CATALYST COMPRISING A ZEOLITE, A ZIRCONIA-CONTAINING MATRIX AND AN ADSORBENT

CROSS REFERENCE TO RELATED APPLICATIONS

This is a division, of application Ser. No. 836,221, filed Sept. 21, 1977, which is a continuation-in-part of U.S. application Ser. No. 746,188 filed Nov. 30, 1976, which in turn is a continuation-in-part of U.S. application Ser. No. 626,225 filed Oct. 28, 1975, now abandoned, the teachings of both of which are hereby incorporated by specific reference.

BACKGROUND OF THE INVENTION

1. Field of the Invention

The present invention relates to novel hydrocarbon conversion catalysts, and uses thereof in hydrocarbon conversion processes. More particularly, the present invention relates to a catalytic cracking catalyst suitable for the coversion of high metals content hydrocarbon feeds.

2. Description Field of the Prior Art

Conventional hydrocarbon conversion catalysts are known to become rapidly deactivated by contact with hydrocarbon feeds containing large amounts of metallic contaminants. Typical feeds utilized, for example, in catalytic cracking have been gas oils, even though coversion of heavy petroleum crude oils and residual oils would increase the yield of gasoline obtainable from a barrel of oil. The heavy crude oils and residual oils, such as bottoms from atmospheric or vacuum distillation of crude oil contain large amounts of material having atmospheric pressure boiling points above 1050° F.+and contain relatively large amounts of metallic contaminants generally present as organometallic compounds, large amounts of nondistillable asphaltenes, i.e. pentane or heptane-insoluble material, large amounts of sulfur and nitrogen and a high Conradson carbon residue. The actual amounts of these materials will vary according to the source of the crude and cut point made during the crude distillation. Tar and oils, shale oils and liquified retorted coal present similar processing difficulties. To facilitate the total refining of these heavy hydrocarbon oils, they may be subjected to a hydrogen refining process. Although the hydrogen refining step facilitates handling and further processing operations since it may remove some of the metals, sulfur, nitrogen and polar compounds, it does not significantly affect the asphaltenes and the Conradson carbon residue contents. Consequently, the hydrogen refined heavy crudes and residua still contain large amounts of materials which are normally deleterious to conventional cracking catalysts. The deposition of metals on the catalyst, principally nickel, vanadium and iron is particularly disadvantageous since these metals adsorb on or near active catalytic sites and act as catalytic agents to produce hydrogen, methane and coke instead of the desired more valuable products such as gasoline and light olefins.

It has now been found that the deleterious effect of feed metal deposition on the hydrocarbon conversion catalyst can be minimized with a catalyst comprising a catalytically inert adsorbent, a zeolite, and an inorganic gel matrix comprising a major amount of silica and minor amounts of zirconia and alumina.

Hydrocarbon coversion catalysts comprising a zeolite dispersed in a siliceous matrix are known, see, for example, U.S. Pat. No. 3,140,249 and U.S. Pat. No. 3,352,796. Cracking catalysts containing a zeolite, silica-alumina and clay are also known, see, for example, U.S. Pat. No. 3,449,265. Hydrocarbon conversion catalysts comprising a physical mixture of silica-alumina and a crystalline aluminosilicate zeolite in a siliceous matrix are also known, see, for example, U.S. Pat. No. 3,558,476. Processes for preparing hydrocarbon conversion catalysts containing a zeolite, clay, and silica or silica alumina are disclosed in U.S. Pat. Nos. 3,867,308, and 3,867,310. Catalysts comprising zirconia are also known, see for example, U.S. Pat. No. 3,558,476, U.S. Pat. No. 3,944,482 and U.S. Pat. No. 3,556,988.

SUMMARY OF THE INVENTION

In accordance with the invention there is provided a process for the conversion of a hydrocarbon oil which comprises: contacting said oil at hydrocarbon conversion conditions with a catalyst comprising: (1) from about 3 to about 16 weight percent of a crystalline aluminosilicate zeolite, (2) from about 50 to about 85 weight percent of an inorganic oxide gel, said inorganic oxide gel comprising a major amount of silica, a minor amount of zirconia and a minor amount of aluminia, and (3) from about 15 to about 40 weight percent of a porous adsorbent having a surface area greater than about 100 square meters per gram and having at least 0.2 cubic centimeter per gram of its pore volume in pores ranging in diameter from about 90 to about 200 Angstroms, said catalyst having at least 0.4 cubic centimeter per gram of its pore volume in pores of greater than 90 Angstroms in diameter.

In accordance with the invention there is further provided the novel hydrocarbon conversion catalyst utilized in the above-stated process.

DESCRIPTION OF THE PREFERRED EMBODIMENT

In general, the catalyst composition of the present invention will comprise from about 3 to about 16 weight percent, preferably from about 8 to about 12 weight percent of a crystalline aluminosilicate zeolite composited with from about 50 to about 85 weight percent, preferably from about 55 to about 75 weight percent of an inorganic oxide gel component which comprises silica, from about 1 to about 15 weight percent preferably from about 1 to 5 weight percent of zirconia based on said inorganic oxide gel component, and from about 0.2 to about 2 weight percent, preferably from about 0.5 to 2 weight percent of alumina, based on said inorganic oxide gel component and from about 15 to about 40 weight percent, preferably from about 20 to about 35 weight percent, based on the total catalyst, of an adsorbent having a relatively high surface area and pore volume.

Zeolite Component

The crystalline aluminosilicate zeolite in the catalyst of the present invention is desirably used in an amount ranging from about 3 to about 16 weight percent, preferably from about 8 to 12 weight percent, based on the total catalyst. The crystalline aluminosilicate zeolite may be chosen from any of the known zeolites. Examples of these zeolites include the zeolites designated by the Linde Division of Union Carbide Corporation by the letters X, Y, A, L (these zeolites are described in U.S. Pat. Nos. 2,882,244; 3,130,007; 2,882,243 and Belgian Pat. No. 575,117, respectively), as well as the naturally occurring crystalline zeolites such as faujasite, chabazite, erionite, mordenite, offretite, gmelinite, analcite, etc.

In general, the chemical formula of anhydrous crystalline aluminosilicate zeolites expressed in terms of moles may be generally represented as follows: $0.9 \pm 0.2$ $M_2O:Al_2O_3:ZSiO_2$ wherein M is selected from the group consisting of hydrogen, monovalent, divalent and trivalent metal cations and mixtures thereof, n is the valence of the cation and Z is a number from about 1.5 to about 12, said value being dependent upon the particular type of zeolite. The zeolite, as produced or found in nature normally contains an alkali metal such as sodium and/or potassium and/or an alkaline earth metal such as calcium and magnesium. The zeolites differ from each other in structure, composition and particularly in the ratio of silica to alumina contained in the crystal lattice structure. For use in hydrocarbon conversion processes, the higher ratio silica to alumina ratio among isostructural zeolites are preferred because of their higher stability at elevated temperature, particularly in the presence of steam. Therefore, whereas the zeolite component of the present invention may be any of the above stated zeolites, the zeolites having silica to alumina ratios above 3 will be preferred. This includes natural and synthetic faujasite and mordenite. Typical among these zeolites is the synthetic faujasite variety wherein Z in the above formula is about 2.3 to 7, preferably 3 to 6, more preferably 4.5 to 5.5. A high silica to alumina ratio zeolite is zeolite Y. Type X zeolite wherein Z in the above formula is less than 3, e.g. 2.5 may also be used to advantage although the most preferred zeolite components for use in the catalyst of the present invention will be those having a silica to alumina ratio greater than 3. The crystalline zeolites have uniform pore openings ranging in diameter from 3 to 15 Angstroms. The preferred pore size catalyst for use as a zeolite component in the present invention will be zeolites having uniform pore size diameter ranging from about 6 to about 15 Angstroms. For use as a hydrocarbon conversion catalyst component, it is usually necessary to reduce the alkali metal content of the crystalline aluminosilicate zeolite to a content of less than 10 weight percent, calculated as metal oxide, preferably less than 6 weight percent, and more preferably about 1 to 5 weight percent since the alkali metal components are normally undesirable catalytic components for the desired hydrocarbon conversion reactions. The alkali metal content reduction may be accomplished as is well known in the art by exchange with any one or more of the cations selected from Group IB through Group VIII metals of the Periodic Table of Elements (the Periodic Table referred to herein is given in the *Handbook of Chemistry and Physics,* published by the Chemical Rubber Publishing Company, Cleveland, Ohio, 45th Edition, 1964), as well as hydrogen cation or hydrogen precursor (i.e. $NH_4+$) capable of conversion to hydrogen cation. The preferred cations are those selected from the group consisting of rare earth metals, calcium, magnesium and hydrogen or mixtures thereof.

Inorganic Oxide Gel Component

The inorganic oxide gel component of the catalyst of the present invention comprises amorphous catalytic inorganic oxides. The inorganic oxide gel component which may be considered the matrix of the catalyst of the present invention comprises a major amount of silica, a minor amount of zirconia and a minor amount of alumina. Suitably, zirconia is present in an amount ranging from about 1 to about 15 weight percent, preferably from about 1 to about 5.0 weight percent, based on the inorganic gel component. Suitably, amorphous catalytically active alumina is present in an amount ranging from about 0.2 to about 2 weight percent, preferably from about 0.5 to about 2 weight percent, based on the inorganic oxide gel component. Silica-alumina-zirconia gels are commercially available and their method of preparation are well known. These materials are generally prepared as a trigel of silica, zirconia and alumina or as alumina and/or zirconia precipitated on a preformed and pre-aged hydrogel. In general, silica is present as the major component in the catalytic solids present in such gels, being present in amounts ranging between about 83 and 98 weight percent, preferably the silica will be present in amounts ranging from about 93 to about 98 weight percent. Particularly preferred are trigels, comprising about 97.5 weight percent silica, 0.5 weight percent alumina and 2 weight percent zirconia. The entire inorganic oxide gel component will be present in the catalyst of the present invention in an amount ranging from about 50 to about 85 weight percent, preferably from about 85 to about 77 weight percent based on the total catalyst.

The Adsorbent

The solid adsorptive component of the catalyst of the present invention will be present in the finished catalyst in an amount ranging from about 15 to about 40 weight percent, preferably from about 20 to about 35 weight percent based on the total catalyst. The adsorbent can be chosen from a wide variety of solid porous catalytically inert materials. By the term "catalytically inert" is intended herein that the adsorptive material has substantially no catalytic activity or has less catalytic activity than the inorganic gel component of the catalyst. Preferably the adsorbent will be an adsorptive bulk material. The term "bulk" with reference to the adsorbent is intended herein to designate a material which has been preformed and placed in a physical form such that its surface area and pore structure is stabilized so that when it is added to an impure inorganic gel containing considerable amounts of residual soluble salts, the salts will not alter the surface and pore characteristics measurably nor will they promote chemical attack on the preformed adsorbent which could then undergo change. For example, addition of "bulk" alumina will mean a material which has been formed by suitable chemical reaction, the slurry aged, filtered, dried, washed free of residual salts and then heated to reduce its volatile content to less than about 15 weight percent. The resulting adsorbent is suitable for use as the adsorbent of the present invention. Suitable materials for use as adsorbent in the catalyst of the present invention include alumina, titania, silica, zirconia, magnesia and mixtures thereof. Preferably the adsorbent is a bulk alumina. Any type of alumina is suitable provided that it has the physical characteristics required by the present invention.

The adsorbent initially used as component in the catalyst of the present invention, after heating at 1000° F. in air for six hours, preferably will have a surface area greater than 100 m$^2$/g, more preferably at least 200 m$^2$/g. Desirably the adsorbent will have at least 0.2 cubic centimeter per gram of its pore volume in pores having diameters ranging from about 90 to about 200 Angstroms. It should be noted that the above stated physical characteristics of the adsorbent are those of the adsorbent prior to its being composited with the other components. The finished total catalyst of the present invention will have a pore size distribution such that when the pore volume is measured after subjecting the finished catalyst to steam treatment at 1400° F., 0 psig, for 16 hours, it will have at least 0.4 cubic centimeter per gram of its pore volume in pores having diameters greater than 90 Angstroms. The pore volume referred to herein is determined by nitrogen adsorption (BET method).

The catalysts of the present invention may be prepared by any one of several methods. A preferred method of preparing one of the catalysts of the present invention, that is, a catalyst comprising silica-alumina-zirconia and as adsorbent, alumina, is to react sodium silicate with a dilute $H_2SO_4$ solution to effect gelation. The silica hydrogel is aged to give the gross pore properties desired, and admixed with a solution of aluminum sulfate, a solution of zirconyl chloride to form a silica/alumina/zirconia hydrogel slurry after adjusting the pH to the range of 5 to 8, which is then filtered to remove a considerable amount of the extraneous and undesired sodium, chloride and sulfate ions and then reslurried in water. Separately, a bulk alumina is made, for example, by reacting solutions of sodium aluminate and aluminum sulfate, under suitable conditions, ageing the slurry to give the desired pore properties of the alumina, filtering, drying, reslurrying in water to remove sodium and sulfate ions and drying to reduce volatile matter content to less than 15 weight percent. The alumina is then slurried in water and blended, in proper amount, with the slurry of impure silica/alumina/zirconia hydrogel.

The zeolite component is then added to this blend. A sufficient amount of each component is utilized to give the desired final composition. If desired, the resulting mixture is then filtered to remove an additional portion of any remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is recovered after calcination for 6 hours at 1000° F. in air. When this catalyst is tested after subjecting it to steam treatment for 16 hours at 0 psig and 1400° F., it will have at least 0.4 cc/g of its pore volume in pores having diameters greater than 90 Angstroms and will be suitable as catalyst of the present invention.

The catalyst of the present invention is suitable for hydrocarbon conversion processes such as catalytic cracking, hydrocracking, isomerization, alkylation, and other carbonium ion catalyzed reaction types.

It is particularly suited for use in catalytic cracking processes and it is especially suited for catalytic cracking of high boiling point hydrocarbonaceous feeds having high metals content, a high Conradson carbon residue, high sulfur content, high nitrogen and other polar molecules to lower boiling hydrocarbon products.

Catalytic cracking with a catalyst of the present invention can be conducted in any conventional catalytic cracking manner. Suitable catalytic cracking conditions include a temperature from about 700° F. to about 1050° F. and a pressure ranging from about subatmospheric to several hundreds of atmospheres.

The usual conditions which may be employed include a temperature ranging from about 750 to about 1025° F., and a pressure ranging from atmospheric to 100 psig, i.e. atmospheric to 20 psig. The process may be carried out in a fixed bed, moving bed, ebullient bed, slurry, transferline or a fluidized bed operation.

Although the catalysts of the present invention can be used to convert any of the conventional hydrocarbon feeds used in a given process (that is, it can be used to crack heavy naphthas and gas oils), they are especially suitable for feeds containing a high content of metal contaminants. By way of example, the catalyst of the present invention can be used to convert heavy crude oils, and residual oils such as petroleum atmospheric or vacuum distillation tower bottoms. The residual oils may contain 95 to 99 weight percent or more of the nickel and vanadium content of the crude oil feed. For example, the total metals content of such oils may range up to 2,000 weight ppm or more and the sulfur content may range up to 8 weight percent or more. The API gravity of such feeds may range from about 5° API to about 35° API and the Conradson carbon residue of the heavy feeds will generally range from about 5 to about 50 weight percent (as to Conradson carbon residue, see ASTM test D-189-65) although the catalyst can be used to convert lower Conradson carbon feeds.

The following example is presented to illustrate the invention.

The catalysts used in the following example were prepared as follows:

Catalyst A—Sodium silicate ($Na_2O.3.25\ SiO_2$) solution was gelled by the careful addition of dilute $H_2SO_4$ and aged. After ageing, an aluminum sulfate solution was added, and then a zirconyl chloride solution. After adjusting the pH to 4.5, the slurry was filtered. The filter cake was re-slurried in $H_2O$ and then bulk porous alumina (Conoco HP grade) was added. After stirring for 10 minutes, rare earth faujasite (Y-type), having a residual $Na_2O$ content of 1.0% was added to the composite, the mixture colloid milled and then spray dried. The material was washed free of extraneous soluble salts, dried, and calcined at 1000° F. The catalyst had a composition of 11% RE-Y/2% $ZrO_2$/0.5% $Al_2O_3$/52.5% $SiO_2$/34% bulk HP grade $Al_2O_3$. Catalyst is a catalyst in accordance with the present invention. The bulk alumina used had a pore volume of at least 0.2 cc/g contained in the 90 to 200 Å pore diameter range.

Catalyst B—This catalyst is a catalyst used for comparison. It is a conventional commercially available catalyst used in catalytic cracking processes. It is believed to comprise 16% rare earth exchanged zeolite Y; 30 to 35% kaolin and 49 to 54% silica-alumina hydrogel. This catalyst was calcined at 1000° F.

EXAMPLE

Catalysts A and B were each steamed 16 hours at 1400° F. and then tested for cracking performance in a batch fluid unit at a low temperature of 750° F. utilizing a 450° to 640° F. virgin gas oil fraction. The resulting data summarized in Table I were obtained at the same feed rate.

TABLE I

| Catalyst | A | B |
|---|---|---|
| % REY[(1)] | 11 | 16 |
| W/Hr/W | | 3.67 |
| Wt. % Conversion, 430° F.− | 70.2 | 65.4 |
| Carbon, % | 5.8 | 7.8 |
| $C_5$/430° F. Yield, wt. % | 62.1 | 55.5 |

TABLE I-continued

| Catalyst | A | B |
|---|---|---|
| C$_5$/430° F. Selectivity % | 88.4 | 85.0 |
| Naphtha/Coke wt. ratio | 10.7 | 7.2 |

[1]REY equals rare earth exchanged zeolite type Y.

As can be seen from the data of Table I, catalyst A, which is a catalyst in accordance with the present invention, showed superior activity and selectivity relative to catalyst B which is a prior art catalyst.

What is claimed is:

1. A process for the conversion of a hydrocarbon oil, which comprises:

contacting said oil at hydrocarbon conversion conditions with a catalyst comprising (1) from 3 to about 16 weight percent of a crystalline aluminosilicate zeolite, (2) from about 50 to about 85 weight percent of an inorganic oxide gel component, said inorganic oxide gel comprising a major amount of silica, a minor amount of zirconia and a minor amount of alumina, and (3) from about 15 to about 40 weight percent of a porous substantially inert inorganic oxide adsorbent having a surface area greater than about 200 square meters per gram and having at least 0.2 cubic centimeter per gram of its pore volume in pores ranging in diameter from about 90 to about 200 Angstroms, said catalyst having at least 0.4 cubic centimeter per gram of its pore volume in pores of greater than 90 Angstroms in diameter.

2. A process of claim 1 wherein said zirconia is present in an amount from about 1 to about 15 weight percent, based on said inorganic gel component and wherein said minor amount of alumina ranges from about 0.2 to about 2 weight percent, based on said inorganic oxide gel component.

3. The process of claim 1 wherein said zirconia is present in an amount from about 1 to about 5 weight percent based on said inorganic oxide gel component.

4. The process of claim 1 wherein said adsorbent is selected from the group consisting of alumina, silica, titania, magnesia and mixtures thereof.

5. The process of claim 1 wherein said adsorbent comprises bulk alumina.

6. The process of claim 1 wherein said hydrocarbon conversion process is catalytic cracking.

7. The process of claim 1 wherein said hydrocarbon oil is a residual petroleum oil.

8. The process of claim 1 wherein said hydrocarbon oil is a gas oil.

9. The process of claim 1 wherein said catalyst comprises a crystalline aluminosilicate zeolite having uniform pore diameters ranging from about 6 to about 15 Angstroms and wherein the silica to alumina ratio is greater than 3.

10. The process of claim 1 wherein said zeolite comprises less than 10 weight percent alkali metal, calculated as the metal oxide.

11. The process of claim 1 wherein said catalyst comprises a crystalline aluminosilicate zeolite having the structure of faujasite.

* * * * *